US010023298B1

United States Patent
Beckman et al.

(10) Patent No.: US 10,023,298 B1
(45) Date of Patent: Jul. 17, 2018

(54) PROPELLER SOUND ALTERATION FOR A DRONE

(71) Applicant: Amazon Technologies, Inc., Seattle, WA (US)

(72) Inventors: Brian C. Beckman, Newcastle, WA (US); Michael Rolnik, Geva Binyamin (IL)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 15/194,317

(22) Filed: Jun. 27, 2016

(51) Int. Cl.
| | |
|---|---|
| B64C 19/00 | (2006.01) |
| G10K 11/16 | (2006.01) |
| B64C 1/40 | (2006.01) |
| B64C 11/00 | (2006.01) |
| G05D 1/10 | (2006.01) |
| B64C 39/02 | (2006.01) |
| G06Q 10/08 | (2012.01) |

(52) U.S. Cl.
CPC .......... *B64C 11/003* (2013.01); *B64C 39/024* (2013.01); *G05D 1/102* (2013.01); *B64C 2201/042* (2013.01); *B64C 2201/108* (2013.01); *B64C 2201/128* (2013.01); *B64C 2220/00* (2013.01); *G06Q 10/083* (2013.01)

(58) Field of Classification Search
CPC ...... B64C 11/003; B64C 39/024; G05D 1/102
See application file for complete search history.

(56) References Cited

U.S. PATENT DOCUMENTS

| | | | |
|---|---|---|---|
| 2006/0158329 A1 | 7/2006 | Burkley et al. | |
| 2007/0103292 A1 | 5/2007 | Burkley et al. | |
| 2012/0097801 A1 | 4/2012 | Barrett et al. | |
| 2013/0056581 A1* | 3/2013 | Sparks ................. | G10K 11/175 244/1 N |
| 2014/0180914 A1* | 6/2014 | Abhyanker .............. | G01C 1/00 705/39 |
| 2015/0000252 A1* | 1/2015 | Moore ...................... | F02K 1/44 60/204 |
| 2015/0056058 A1* | 2/2015 | Grissom ............... | F04D 29/665 415/1 |
| 2016/0063987 A1* | 3/2016 | Xu ........................ | B64C 39/024 381/71.12 |
| 2016/0068267 A1* | 3/2016 | Liu ........................ | B64C 39/024 701/11 |

(Continued)

OTHER PUBLICATIONS

U.S. Appl. No. 15/194,258, filed Jun. 27, 2016, Titled: Drone Noise Reduction.

(Continued)

*Primary Examiner* — Adam D Tissot
(74) *Attorney, Agent, or Firm* — Kilpatrick Townsend & Stockton LLP

(57) ABSTRACT

Techniques for using an unmanned aerial vehicle (UAV) to deliver a payload while reducing and/or altering sound generated by the UAV during delivery may be provided. For example, during delivery, the UAV may be instructed to utilize one or more sets of propellers of different sizes to reduce and/or alter the sound generated by and/or around the UAV. Intrinsic and extrinsic information associated with the UAV may be utilized to dynamically adjust the particular sets of propellers of a certain and different size to utilize during different portions of a flight path while delivering the payload.

19 Claims, 8 Drawing Sheets

(56) References Cited

U.S. PATENT DOCUMENTS

| | | | |
|---|---|---|---|
| 2016/0083073 A1* | 3/2016 | Beckman | G09F 9/33 40/463 |
| 2016/0107751 A1* | 4/2016 | D'Andrea | B64C 27/20 701/4 |
| 2016/0125746 A1 | 5/2016 | Kunzi et al. | |
| 2016/0258758 A1 | 9/2016 | Houston et al. | |

OTHER PUBLICATIONS

U.S. Appl. No. 15/230,223, filed Aug. 5, 2016, Titled: Static Inverse Desymmetrized Propellers.

U.S. Appl. No. 15/255,098, filed Sep. 1, 2016, Titled: Drone Noise Reduction Via Simultaneous Propeller Modulation.

U.S. Appl. No. 15/353,637, filed Nov. 16, 2016, Titled: On-Demand Drone Noise Measurements.

U.S. Appl. No. 14/975,265, filed Dec. 18, 2015, Titled: Propeller Blade Leading Edge Serrations for Improved Sound Control.

PCT/US2017/039476, "PCT Search Report", dated Oct. 2, 2017, 13 pages.

Yoon et al., "Advanced Sound Capturing Method With Adaptive Noise Reduction System for Broadcasting Multi Copters", *2015 IEEE International Conference on Consumer Electronics (ICCE), IEEE* (Jan. 9, 2015), pp. 26-29.

\* cited by examiner

PROPELLER SOUND ALTERATION FOR A DRONE

CROSS-REFERENCES TO RELATED APPLICATIONS

This application is related to and incorporates by reference for all purposes the full disclosures of U.S. patent application Ser. No. 15/194,258, filed Jun. 27, 2016, entitled "DRONE NOISE REDUCTION"; U.S. patent application Ser. No. 15/230,223, filed Aug. 5, 2016, entitled "STATIC INVERSE DESYMMETRIZED PROPELLERS"; U.S. patent application Ser. No. 15/255,098, filed Sep. 1, 2016, entitled "DRONE NOISE REDUCTION VIA SIMULTANEOUS PROPELLER MODULATION"; and U.S. patent application Ser. No. 15/353,637, filed Nov. 16, 2016, entitled "ON-DEMAND DRONE NOISE MEASUREMENTS".

BACKGROUND

More and more users are turning to network-based resources, such as electronic marketplaces, to purchase items (e.g., goods and/or services). A network-based resource may provide a user experience unmatched by a more traditional brick and mortar store. For example, the network-based resource may offer a larger and more diverse selection of items. Further, for some of the items, there may be a number of sellers with different offers. As such, a customer may not only have access to a rich item selection, but may also obtain items at the most convenient offers.

Typically, a user (e.g., a customer) may operate a computing device to access a network-based resource and request information about an item. The network-based resource may provide the information and information about an available delivery method. In turn, the user may purchase the item from the network-based resource and specify a delivery location. The item may be accordingly delivered to the delivery location. The network-based resource may provide an option to deliver the item to the delivery location via an unmanned aerial vehicle (UAV) thus increasing traffic and noise levels near the delivery location.

BRIEF DESCRIPTION OF THE DRAWINGS

Various embodiments in accordance with the present disclosure will be described with reference to the drawings, in which.

DETAILED DESCRIPTION

Figure 1:
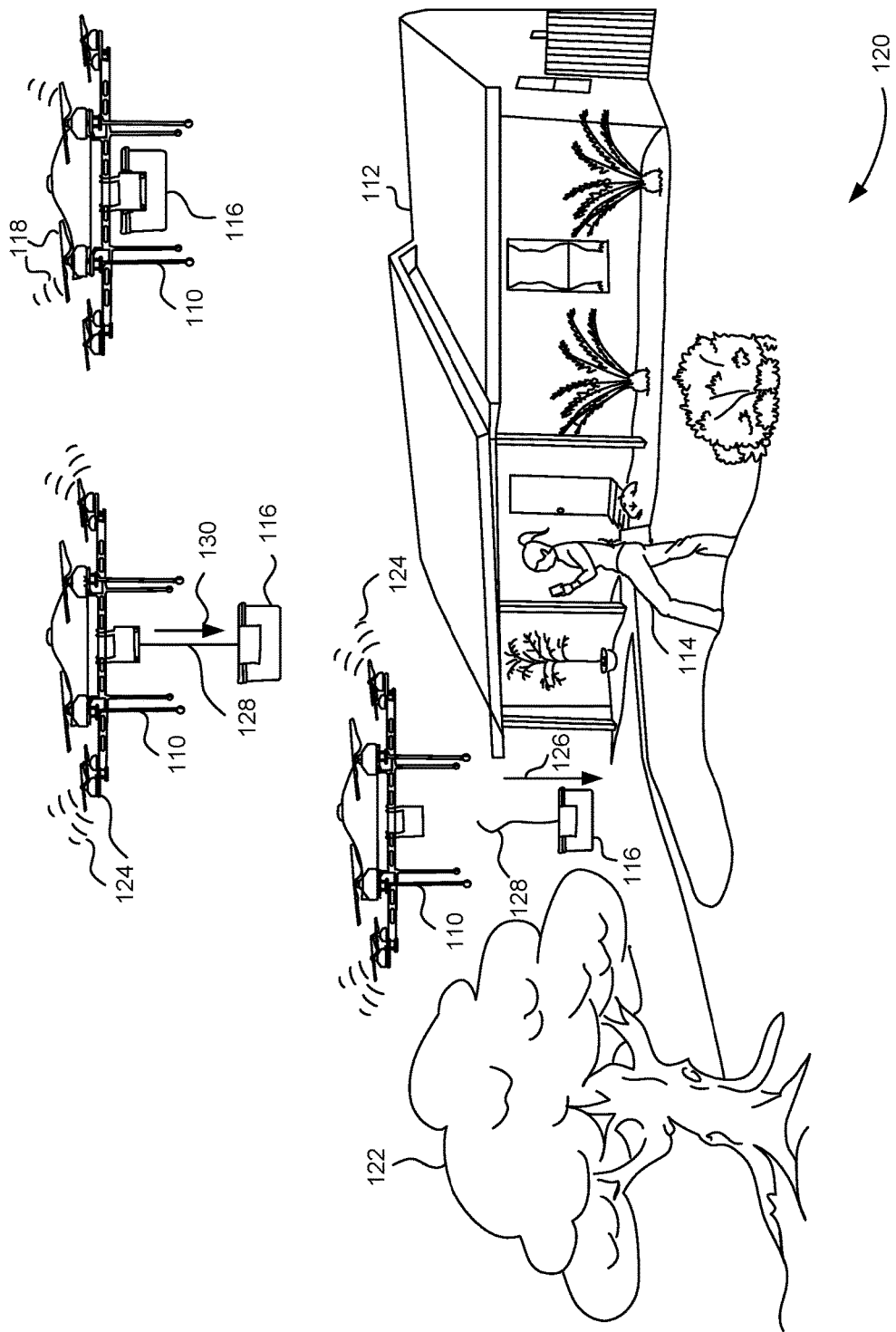
FIG. 1 illustrates an example environment for reducing and/or altering sound generated by a UAV during delivery of an item, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, reducing and/or altering sound generated by an unmanned aerial vehicle (UAV) during delivery of a payload, such as one containing an item ordered from a network-based resource. In particular, a UAV may be configured to utilize one or more sets of different sized propellers during delivery of the payload to reduce the overall decibel level of sound generated by the UAV and to generate a more pleasurable sound for nearby users. For example, during a flight path of the UAV to deliver an item to a particular location, a first set of propellers of a first size may be utilized during a transit portion of the flight, whereas a second set of propellers of a second size that is different from the first size may be utilized during a delivery or landing portion of the flight. hold a payload during a flight to a delivery location and to release the payload upon arrival to the delivery location.

In some embodiments, in addition to configuring a UAV to utilize different sized propellers, other variations and/or treatments to the propellers themselves may be implemented to reduce and/or alter the sound generated by the UAV during flight. For example, a propeller blade may include propeller blade treatments along one or more portions of the propeller blade (e.g., blade treatments along the leading edge of the propeller blade). Each propeller blade set, of a different size from another propeller blade set of the UAV, may be composed of different materials or have other surface treatments such as indentations, pores, etc. In some embodiments, a set of propeller blades may be angled at a certain angle with respect to the UAV to provide different types of control and movement during propulsion of the UAV. Some propeller blades may include treatments for reducing noise which can be activated via a propeller blade treatment adjustment controller that retracts and/or extends one or more of the propeller blade treatments. Other propeller blade treatments, compositions, or angle variations are included in the current disclosure and as described in U.S. patent application Ser. No. 14/975,265, filed Dec. 18, 2015, entitled, "PROPELLER BLADE LEADING EDGE SERRATIONS FOR IMPROVED SOUND CONTROL" (Client Reference No. P29305-US), which is herein incorporated by reference. In some embodiments, the rotational speed of the different sized propeller blades may be adjusted to reduce and/or alter the sound generated by the UAV during flight.

In embodiments, one or more sensors may be associated or positioned on the UAV to measure sound generated by or around the UAV during delivery of an item and while in flight. In embodiments, the measured sounds can be utilized to generate a sound profile that identifies a particular decibel level and other metrics associated with the sounds generated by or around the UAV. For example, a sound profile may be generated for each set of different sized propellers that identifies a decibel level, loudness, sharpness, roughness, fluctuation strength, and tonal prominence. Each metric included in the sound profile may be compared to one or more thresholds that correspond to the portion of the flight for delivery of an item to determine if the sound generated by the UAV should be reduced or altered. For example, one threshold that tolerates a large amount of noise may be utilized during a transit mode whereas another threshold that identifies a small amount of noise may be utilized during a different portion of the flight such as delivery or take off. In some embodiments, a computer system in communication with the UAV or a computer system of the UAV may generate the sound profiles utilizing the information provided by the one or more sensors. In some embodiments, the sound profiles may be utilized to provide instructions to the UAV and associated components which result in the modulation from a first set of propellers of a first size to a second set of propellers of a second size or some combination of the two to reduce or alter the noise. For example, one or more sets of different sized propellers may be instructed to propel the UAV and reduce the noise generated by the UAV by providing a noise cancellation of frequencies rather than an additive effect of utilizing more than one set of the same sized propellers. As used herein, to modulate or modulation includes altering or changing the RPMs of a corresponding propeller blade including a complete transition (start/stop) from a first propeller of a first size to a second propeller of a second size.

In embodiments, information that identifies a current location of the UAV may also be utilized to determine a particular sound profile to utilize when instructing which sets of propellers sizes the UAV should use during flight. For example, a flight plan may be generated that instructs the UAV to deliver the payload to a destination. During flight and at various points of the flight plan, pre-generated sound profiles and the current location of the UAV in the flight plan may be utilized as data points to instruct the modulation from one set of propellers to a different set of propellers of a different size to reduce and/or alter the noise generated by the UAV. In some embodiments, information may be obtained or received that identifies a component failure, such as a motor failure and/or performance metrics associated with the various components of the UAV including the motors and propellers. Instructions may be generated and transmitted and/or utilized by the UAV to modulate from a first set of propellers to a second set of propellers to prevent an unexpected de-acceleration of the UAV during delivery based on the information that identifies component failure or performance metrics. In some embodiments, users who initially ordered the item for delivery and nearby neighbors may provide input, or be requested for input, regarding the relative noise level of the UAV during a delivery. The input provided by the users can be utilized to dynamically update the sound profiles and updated instructions may be provided to modulate different sized propellers and/or a new configuration of multiple sets of different sized propellers to reduce and/or alter the sound generated by the UAV. Pre-generated sound profiles may be updated using the user input for subsequent deliveries to the same delivery location or destination.

In some implementations, measured sounds may be recorded along with and/or independently of other operational and/or environmental data. Such information or data may include, but is not limited to, extrinsic information or data, e.g., information or data not directly relating to the unmanned aerial vehicle, or intrinsic information or data, e.g., information or data relating to the unmanned aerial vehicle itself. For example, extrinsic information or data may include, but is not limited to, environmental conditions (e.g., temperature, pressure, humidity, wind speed, and wind direction), times of day or days of a week, month or year when an unmanned aerial vehicle is operating, measures of cloud coverage, sunshine, surface conditions or textures (e.g., whether surfaces are wet, dry, covered with sand or snow or have any other texture) within a given environment, a phase of the moon, ocean tides, the direction of the earth's magnetic field, a pollution level in the air, a particulates count, or any other factors within the given environment. Intrinsic information or data may include, but is not limited to, operational characteristics (e.g., dynamic attributes such as altitudes, courses, speeds, rates of climb or descent, turn rates, or accelerations; or physical attributes such as dimensions of structures or frames, numbers of propellers or motors, operating speeds of such motors,) tracked positions (e.g., latitudes and/or longitudes) of the unmanned aerial vehicles, or status of package delivered. In accordance with the present disclosure, the amount, the type and the variety of information or data that may be captured and collected regarding the physical or operational environments in which unmanned aerial vehicles are operating and correlated with information or data regarding measured sounds is theoretically unbounded. In some embodiments, an indication or information may identify that the UAV has successfully delivered an item to a delivery location. This data point can also be utilized to modulate between different sized propellers sets as less lift, power, and/or propulsion may be required to fly and return the UAV to an origin location (a related facility) and thus the sound generated by the UAV may be further altered and/or reduced.

The extrinsic information or data and/or the intrinsic information or data captured by unmanned aerial vehicles during flight may be used to train a machine learning system to associate an unmanned aerial vehicle's operations or locations, or conditions in such locations, with sounds generated by the unmanned aerial vehicle. The trained machine learning system, or a sound profile developed using such a trained machine learning system, may then be used to predict sounds that may be expected when an unmanned aerial vehicle operates in a predetermined location, or subject to a predetermined set of conditions, at given velocities or positions, or in accordance with any other characteristics (such as utilizing a set of propellers of a certain size that is different from another set of propellers of a different size). Once such sounds are predicted, propeller blade size configurations, treatments, compositions, and/or positions that will result in the UAV generating an altered and or reduced sound is determined. In some examples, different configurations of propellers of different sizes may be determined for generating anti-sounds. An anti-sound, as used herein, refers to sounds having amplitudes and frequencies that are approximately but not exclusively opposite and/or approximately but not exclusively out-of-phase with the predicted or measured sounds (e.g., having polarities that are reversed with respect to polarities of the predicted sounds). During airborne operation of the unmanned aerial vehicle, the particular configuration of propeller sets of different sized propellers are utilized so that the propellers may generate the anti-sound. When the anti-sounds are generated by the propeller blades, such anti-sounds effectively modify the effects of some or all of the predicted sounds at those locations. In this regard, the systems and methods described herein may be utilized to effectively control, reduce, and/or otherwise alter the sounds generated by unmanned aerial vehicles during flight.

To illustrate, consider an example of a network-based resource, such as a web site, associated with an electronic marketplace. A user may access the web site and order cotton napkins and porcelain plates. A UAV may be accordingly deployed to deliver the order from a facility to a location associated with the user. During the flight of the UAV, instructions may be generated and provided to the UAV which instruct the modulation from a first set of propellers of a first size to a second set of propellers of a second size to alter or reduce the sound generated by the UAV at various portions of the delivery. The UAV may hold a package containing the cotton napkins and the porcelain plates. Upon arrival to the location, the UAV may lower a cable that couples the package of napkins and porcelain plates to the UAV. In parallel or subsequently, the UAV may modulate between one or more sets of propellers of different sizes to successfully maintain flight, deliver the package, and reduce and/or alter the sound generated by the UAV. Upon the package landing at the location, the cable may be severed. Subsequently, the UAV may again modulate to a different set(s) of propellers of different sizes to return to the facility.

Although the above illustration uses a cable to deliver the package to the location, the embodiments herein are not limited as such. Instead, the UAV may deliver the package to the location by landing on a surface or may delivery the package by releasing the package from a certain height above the location and utilize a parachute mechanism that is coupled to the package to complete delivery.

In the interest of clarity of explanation, the embodiments may be described herein in the context of a UAV delivering a package containing an item ordered from a network-based resource, where the delivery may include lowering the package using a cable. However, the embodiments are not limited as such. Instead, the embodiments may similarly apply to one or more UAVs, each or a collection thereof delivering one/or more payloads. Generally, the delivering may include using one or more tethers, such as one or more cables of the same or of different types, to lower the one or more payloads and releasing the one or more tethers causing the one or more payloads to be delivered. Releasing a tether from a UAV may include severing the tether or decoupling, without severing, the tether from the UAV.

Turning to FIG. 1, 1 an example environment for reducing and/or altering sound generated by a UAV during delivery of an item, according to embodiments is illustrated. In particular, a UAV 110 may be deployed to a location 112 associated with a user 114 to deliver a package 116. In this example environment, the location 112 is shown as a dwelling of the user 114. However, the embodiments described herein are not limited as such and may similarly apply to other types of locations and/or other associations to the user. In FIG. 1, the UAV 110 is currently configured to utilize a first set of propellers 118, while in transit, that generate a first sound. The UAV 110 may be generating the first sound while utilizing the first set of propellers 118 that is expected based on a determined sound profile when utilizing the first set of propellers 118. It should be noted that FIG. 1 illustrates the UAV 110 utilizing the first set of propellers 118 absent the use of any other of the sets of propellers associated with UAV 110. In some embodiments, the UAV 110 may utilize multiple sets of propellers of different sizes in various configurations (propeller treatments, compositions, rotational speed, etc.,) to alter or reduce the sound generated by UAV 110.

In an example, the user 114 may have operated a computing device to access a network-based resource to order an item. Based on this order, the item may be packaged at a facility and loaded on the UAV 110. The UAV 110 may be remotely controlled or autonomously operated to fly the package 116 from the facility to the location 112, deliver the package 116, and return to the facility or to some other location. These operations of the UAV 110 may represent an example mission that the UAV 110 may be deployed to perform.

Upon arrival to the location 112 (e.g., to the exact location 112 or to a vicinity thereof), the UAV 110 may determine a delivery surface 120 to deliver the package 116. FIG. 1 illustrates the delivery surface 120 as a surface of a backyard of the user's dwelling. However, the embodiments described herein are not limited as such and may similarly apply to other types of surfaces and/or other associations to location 112. In embodiments, upon arrival to the location 112, one or more sensors associated with the UAV 110 may obtain or receive extrinsic and intrinsic data of or around the UAV 110 to generate a sound profile that will identify an expected sound generated by the UAV 110 given a given configuration of the different sized sets of propellers. The extrinsic and intrinsic data about the UAV 110 and the surrounding environment may include the presence of the user 114, details about the location 112 (such as echo producing structures i.e., pits, empty pools, etc.,) other items in the environment 122, and information about the UAV 110 itself. In one example technique, data about the location 112, including items in the environment 112, and other suitable information such as spatial coordinates may be provided to the UAV 110 (e.g., transmitted thereto and stored thereafter) prior to leaving the facility, on the way to the location 112, or upon arrival to the location 112. This data may be generated based on sensors of the UAV 110. For instance, the UAV 110 may be equipped with a number of sensors, such as imaging, motion, radio frequency, and/or other sensors and one or more processing units to sense and process environmental data associated with the location and sound generated by or around the UAV 110. Of course, a combination of both example techniques may be used.

In embodiments, as the UAV 110 approaches the delivery surface 120, instructions may be transmitted or generated that enable the UAV 110 to modulate from the first set of propellers of a first size 118 to a second set of propellers of a second size 124. The modulation from the first set of propellers of the first size 118 to the second set of propellers of the second size 124 may reduce and/or alter the sound generated by the UAV 110 during delivery of the package 116. In embodiments, the UAV may receive input that the package 116 has been delivered 126 via an associated cable 128. This data point of successful delivery may be utilized to further update or generate a new sound profile for the UAV 110 that further instructs the modulation between the sets of propellers of different sizes (118, 124) to propel the UAV 110 back to the origination facility. In some embodiments, the sound profile may be updated based on the updated weight of the UAV 110 which in turn alters the sound generated by the UAV when particular sets of propellers of different sizes are utilized.

In embodiments where pre-generated sound profiles are utilized, the UAV 110 may provide or utilize its relative location to the delivery location 112 to select a particular sound profile and therefore configuration of sets of propellers of a certain size to generate an expected sound. For example, after delivery, the sound profile and corresponding instructions may instruct the UAV 110 to utilize both the first set of propellers of a first size 118 and the second set of propellers of a second size 124 to lift the UAV 110 to an appropriate height before returning to the origin facility. As described herein, embodiments of the current disclosure include the use of both sets of propellers (118 and 124) to generate anti-sound or further reduce and/or alter the sound generated by the UAV during various portions of the delivery from an origin location to the delivery location 112. Certain environmental data or sound generated by the UAV 110 in the delivery location 112 may be captured and stored for later use to train machine learning algorithms in generating and utilizing various sound profiles for the particular delivery location and UAV 110 propeller configuration.

Figure 2:
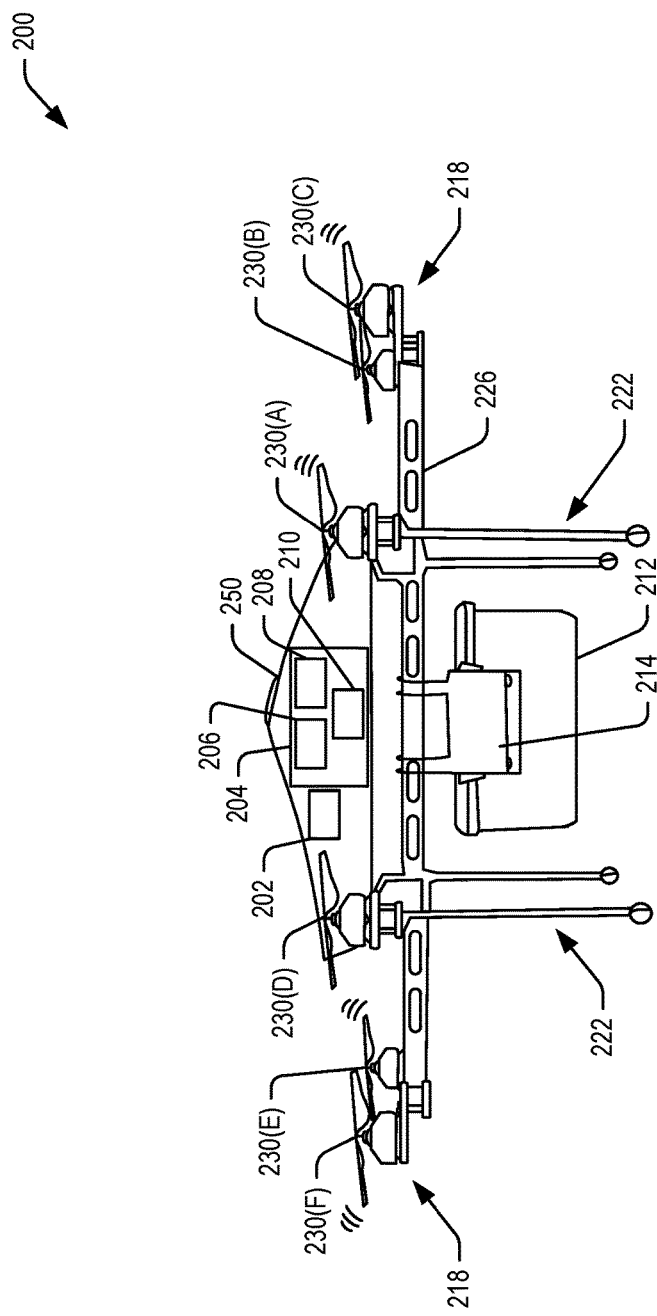
FIG. 2 illustrates an example unmanned aerial vehicle configured to deliver an item, according to embodiments.

Example components of a UAV, such as the UAV 110, configured to deliver a package to a location and reduce and/or alter sound generated by the UAV 110 are further illustrated in FIG. 2. This UAV may use a cable, such as the cable 128, as a part of the delivery approach. The cable may be added (e.g., installed, loaded, attached, coupled, connected) to the UAV as a part of deploying the UAV on the delivery mission. This UAV may use different configurations of sets of propellers of different sizes to deliver the item to the delivery location.

FIG. 2 illustrates an example unmanned aerial vehicle configured to deliver an item, according to embodiments. In FIG. 2, an example UAV 200 configured to deliver an item is illustrated. The UAV 200 may be designed in accordance with commercial aviation standards and may include multiple redundancies to ensure reliability. In particular, the UAV 200 may include a plurality of systems or subsystems operating under the control of, or at least partly under the control of, a management component 202. The management component 202 may be configured to mechanically and/or electronically manage and/or control various operations of other components of the UAV 200. For example, the management component 202 may include various sensing, activating, and monitoring mechanisms to manage and control the various operations. For instance, the management component 202 may include or interface with an onboard computing system 204 hosting a management module for autonomously or semi-autonomously controlling and managing various operations of the UAV 200 and, in some examples, for enabling remote control by a pilot. The various operations may also include managing other components of the UAV 200, such as a propulsion system 218 to facilitate flights, a payload holding mechanism 212 to facilitate holding a payload (e.g., a package), and/or a payload releasing mechanism 214 to facilitate release and delivery of the payload. Portions of the management component 202, including mechanical and/or electronic control mechanisms may be housed under the top cover 250 or distributed within other components such as the payload holding mechanism 212 and the payload releasing mechanism 214. In a further example, components remote from the UAV 200 may be deployed and may be in communication with the management component 202 to direct some or all of the operations of the management component 202. These remote components may also be referred to as a management component. In an example, the management component 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), and radio-frequency identification (RFID) capability (not shown).

The UAV 200 may also include the onboard computing system 204. In an example, the computing system 204 may be integrated with the management component 202. In another example, the computing system 204 may be separate from but may interface with the management component 202. The computing system 204 may be configured to provide an electronic control of various operations of the UAV 200, including the ones provided by the management module. In an example, the computing system 204 may also process sensed data by one or more other components of the UAV, such as the management component 200, to generate data associated with a delivery surface. In a further example, the computing system 204 may also electronically control components of the payload holding mechanism 212 and/or the payload releasing mechanism 214. In another example, the computing system 204 may also electronically control components of the UAV 200 such as a plurality of propulsion devices, a few of which, 230(A)-230(F) are included in FIG. 2. The management component 202 and computing system 204 may be configured to alter the usage, modulation, and rotational speed of the propellers of the propulsion devices 230(A)-230(F) to reduce and/or alter the noise generated by the UAV 200 as described herein. In embodiments, the propellers of the propulsion devices 230(A)-230(F) may be of various and different sizes from one another (such as varied length, width, or any other suitable dimensional combination to enable a difference between propeller sizes). As illustrated in FIG. 2, the computing system 204 may be housed within the top cover 250 and may include a number of components, such as a computer 206, a storage device 208, and an interface 210. The computer 206 may host the management module configured to provide management operations of the flight and/or other portions of a mission of the UAV 200. For example, the data management module may generate the data associated with the sound generated by or around the UAV 200, determine an appropriate sound profile, direct the modulation between different sets of propellers of different sizes, determine an appropriate delivery surface, determine a distance by which to lower a payload, a speed of lowering the payload, direct the propulsion system to position the UAV 200 according to this data, activate a release of a package from the payload holding mechanism 212, activate a release of a cable, and/or activate other functions of the mission, and continue to modulate between the different sets of propellers of different sizes during various portions of the mission to deliver the payload. The storage device 208 may represent one or more storage media, such as a volatile or non-volatile semiconductor, magnetic, or optical storage media. In an example, the storage device 208 may be configured to store any operational data of the UAV 200, extrinsic or intrinsic sound data obtained by sensors associated with the UAV 200 regarding sound generated by or around the UAV 200, generated or received data associated with the delivery surface, and/or received data associated with a delivery location. The data may include the distance by which the payload may be lowered and the lowering speed. In addition, the storage device 208 may store a set of rules associated with lowering and releasing the payload. This set of rules may specify parameters to determine, where, when, and/or how to deliver the payload such that a likelihood of damaging the payload (or content thereof) and/or interference with the UAV 200 may be reduced. The set of rules may also specify parameters to determine appropriate sound levels regarding metrics included in a sound profile (loudness, fluctuation strength, etc.,). The computer 206 (e.g., the management module) may monitor and/or determine some or all of the parameters and accordingly generate the distance and/or the speed for delivery and determine the appropriate sets of particular propellers of a certain size with corresponding rotational speed to utilize to reduce and/or alter sound generated by the UAV 200. In some embodiments, the computer 206 (e.g., the management module) may generate instructions for deploying particular propeller treatments for reducing and/or altering sound generated during flight of the UAV 200. The modulation between different sets of propellers and/or deployment/retraction of propeller treatments may be electronically or mechanically controlled. The interface 210 may represent an interface for exchanging data as part of managing and/or controlling some of the operations of the UAV 210. In an example, the interface 210 may be configured to facilitate data exchanges with the management component 202, other components of the UAV 200, and/or other components remote from the UAV 200. As such, the interface 210 may include high speed interfaces, wired and/or wireless, serial and/or parallel, to enable fast upload and download of data to and from the computing system 204.

As shown in FIG. 2, the UAV 200 may also include the payload holding mechanism 212. The payload holding mechanism 212 may be configured to hold or retain a payload. In some examples, the payload holding mechanism 212 may hold or retain the payload using friction, vacuum suction, opposing arms, magnets, holding, and/or other retaining mechanisms. As illustrated in FIG. 2, the payload holding mechanism 212 may include a compartment configured to contain the payload. In another example, the payload holding mechanism 212 may include two opposing arms configured to apply friction to the payload. The management component 202 may be configured to control at least a portion of the payload holding mechanism 212. For example, the management component 202 may electronically and/or mechanically activate the payload holding mechanism 212 to hold and/or release the payload. In an example, the payload may be released from the payload holding mechanism 212 by opening the compartment, pushing the payload, moving one or both of the opposing arms, and/or stopping an application of friction, vacuum suction, and/or magnetic force.

The UAV 200 may also include the payload releasing mechanism 214. In an example, the payload releasing mechanism 214 may be integrated with the payload holding mechanism 212. In another example, the payload releasing mechanism may be separate from the payload holding mechanism 212. In both examples, the payload releasing mechanism 214 may be configured to lower, using a cable, a payload released from the payload holding mechanism 214 and to release the cable once the payload is lowered by a distance.

As such, the payload releasing mechanism 214 may include a lowering mechanism and a release mechanism. For example, the lowering mechanism may include a cable and/or an electronic or mechanical control configured to lower the cable at a controlled speed. For example, this control may include a winch, a spool, a ratchet, and/or a clamp. The cable may couple the payload with the UAV 200. For example, one end of the cable may be connected, attached, or integral to the payload. Another end of the cable may be coupled to one or more components of the payload releasing mechanism 214, the payload holding mechanism 212, the frame of the UAV 200, and/or other component(s) of the UAV 200. For example, the cable may be coiled around the winch or spool or may be stowed or coiled inside the compartment (if one is used as part of the payload holding mechanism 212). The cable may have a configuration selected based on the mission of the UAV 200, the mass of the payload, and/or an expected environment associated with the delivery location (e.g., the potential interference).

In an example, the release mechanism may be integrated with the lowering mechanism. In another example, the release mechanism may be separate from the lowering mechanism. In both examples, the release mechanism may be configured to release the cable when the payload may have been lowered by a certain distance. Releasing the cable may include severing the cable, weakening the cable, and/or decoupling the cable from the UAV 200 (e.g. from the payload releasing mechanism 214) without severing or weakening the cable.

To sever the cable, the release mechanism may include a sharp surface, such as a blade to, for example, cut the cable when applied thereto. To weaken the cable, the release mechanism may include a sharp head, edge, and/or point, such as a hole puncher, or a friction surface to cause a damage to the integrity of the structure of the cable. Other release mechanisms may also be used to sever or weaken the cable. An example may include a mechanism configured to apply a thermoelectric effect to the cable. For instance, a contact surface, such as one using an electrical conductor, may be configured to release heat upon application of a voltage. The contact surface may come in contact with the cable or may be integrated within different sections of the cable. Upon application of the voltage, the contact surface may sever or weaken the cable by applying heat to the cable. To decouple the cable from the UAV 200, the cable may be in the first place insecurely coupled to the UAV 200 such that, upon an unwinding of the cable, the cable may become detached from the UAV 200. For example, the cable may be coiled around the winch or spool without having any of the cable ends attached to the winch or spool or to another component of the UAV 200. In another example, the cable may be coupled to a component of the UAV 200 through a weak link such that upon a tension generated based on the mass of the payload, the link may be broken to free the cable from the UAV 200.

The release mechanism may be electronically or mechanically controlled. This control may be effected based on, for example, the distance by which the payload may have been lowered and/or based on an amount of a tension of the cable, an increase in the amount, a decrease in the amount, or a sudden or fast change in the amount. Various configurations may be used to measure the distance, the amount of tension, and the change in the amount. For example, the distance may be determined from the number of rotations of a winch or spool if one is used or based on a distance or cable length sensor. The amount of the tension and the change in the amount may be determined based on spring-based or electronic-based sensors.

Further, the release mechanism may be electronically activated based on a signal generated in response to detecting that the distance may have been traveled and/or the amount or change in the amount of tension. In another example, the release mechanism may be activated based on a mechanical configuration. For example, as the cable may be lowered, a ratchet may load a spring that may be coupled to release mechanism. Upon the load exceeding a threshold, the spring may be released, thereby activating the release mechanism. In another example, a tension of the cable may be used to hold the release mechanism away from the cable. As soon as the tension changes (e.g., the cable becomes loose indicating that the payload may be resting on the ground), the release mechanism may be activated to sever or weaken the cable.

Further, the UAV 200 may include a propulsion system 218. In some examples, the propulsion system 218 may include rotary blades or otherwise be a propeller-based system. As illustrated in FIG. 2, the propulsion system 218 may include a plurality of propulsion devices, a few of which, 230(A)-230(F), are shown in this view. Each propeller device may include one propeller, a motor, wiring, a balance system, a control mechanism, and other features to enable flight. In some examples, the propulsion system 218 may operate at least partially under the control of the management component 202. In some examples, the propulsion system 218 may be configured to adjust itself without receiving instructions from the management component 202. Thus, the propulsion system 218 may operate semi-autonomously or autonomously. In some embodiments, the propulsion system 218 may, in conjunction from instructions from the management module, dynamically modulate between the different sets of different size propellers to reduce and/or alter the sound generated by UAV 200.

The UAV 200 may also include landing structure 222. The landing structure 222 may be adequately rigid to support the UAV 200 and the payload. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226. In some examples, the frame 226 may attach or be associated with one or more fixed wings.

Hence, a UAV, similar to the UAV 200, may be deployed on a mission to, for example, deliver a payload, by modulating between and or utilizing simultaneously sets of propellers of different sizes. The UAV may autonomously or semi-autonomously complete or perform a portion of the mission. For example, coordinates of a delivery location may be provided to the UAV. The UAV may hold the payload in a payload holding mechanism and fly to the delivery location. Further, the UAV may utilize a portion of the one or more sets of propellers of different sizes to propel the UAV and generate an expected sound or sound level during delivery. Upon arrival to the location, the UAV may sense or obtain data from one or more sensors to modify the configuration/modulation from a first set of propellers of a first size to a second set of propellers of a different size (either exclusively or simultaneously) to alter and/or reduce the noise generated by the UAV. Accordingly the UAV may release the payload from the payload holding mechanism. The UAV may again modulate and modify the confirmation the sets of propellers of different sizes to gain altitude and begin the return trip to an origin location or facility from which it deployed.

Figure 3:
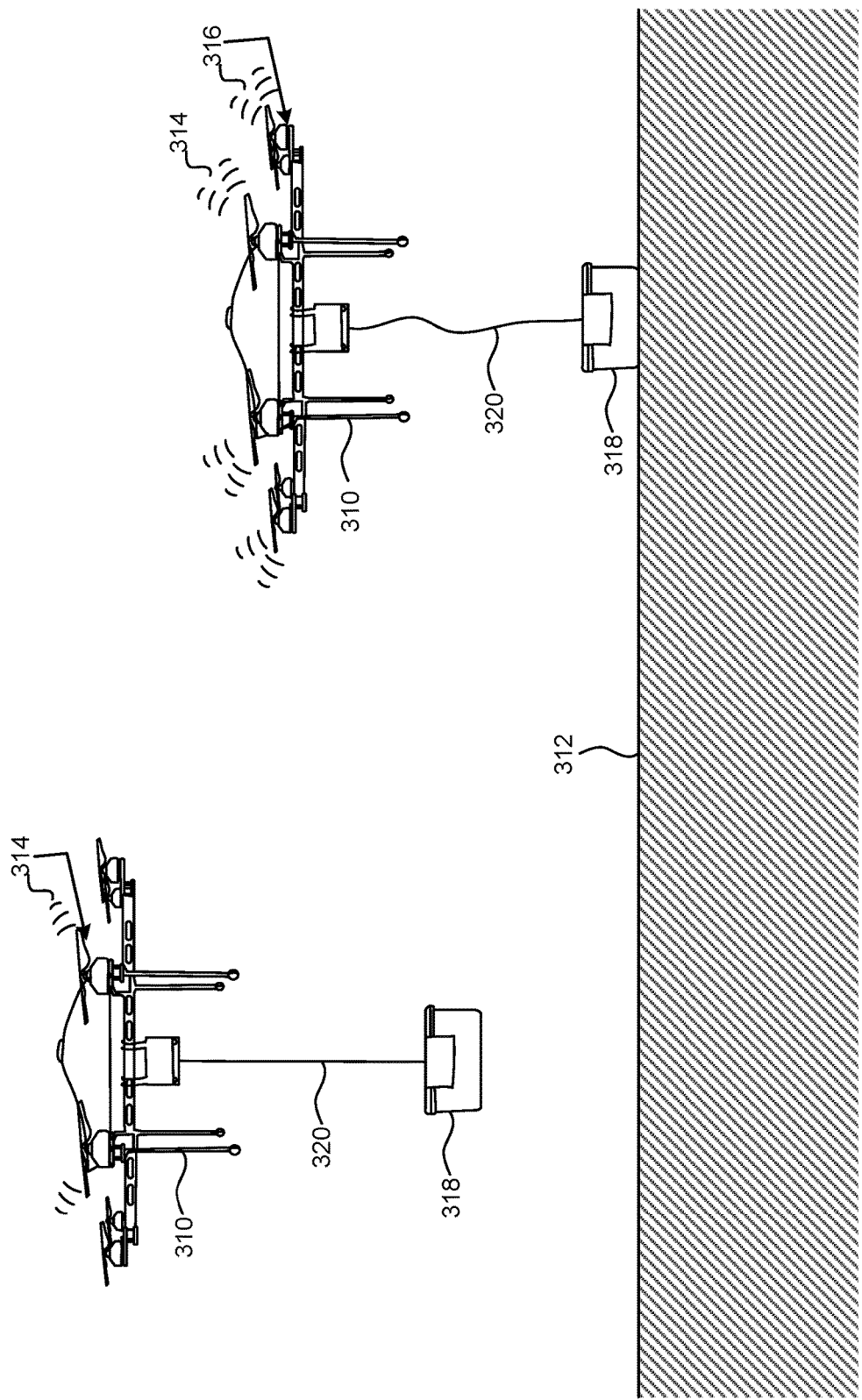
FIG. 3 illustrates example approaches for reducing and/or altering sound generated while delivering an item, according to embodiments.

FIG. 3 illustrates example approaches for reducing and/or altering sound generated while delivering an item, according to embodiments. FIG. 3 illustrates a UAV 310 (referring to the left hand side illustration) on approach to a delivery location 312 utilizing a first configuration of a set of propellers of a first size 314. As illustrated in FIG. 3, the first configuration of the set of propellers of the first size 314 includes utilizing a set of propellers 314 that are larger than the other sets of propellers (316) on approach to the delivery location 312. As described herein, the different sets of propellers (314 and 316) may be of different sizes and may have different dressings or treatments which further aid in reducing or altering the sound generated by the UAV 310 during delivery of the item 318.

FIG. 3 illustrates the UAV 310 utilizing the first configuration of propellers of the first size 314 to lower, via a cable 320, the item 318 to the delivery location 312. In embodiments, the UAV 310 may utilize the first configuration on approach based on a sound profile generated utilizing intrinsic and extrinsic data from or around the UAV 310 to generate an expected sound. For example, the data may indicate that utilizing the first configuration of propellers on approach to delivery location 312 may generate a sound that is tolerable or has metrics included in the sound profile which do not exceed a threshold associated with location 312. Upon delivery of the item 318 by the UAV 310 (referring to the right hand side illustration), another sound profile may be generated or the original sound profile updated with input confirming delivery of the item 318 to the delivery location 312. The updated/different sound profile may be utilized to generate instructions for utilizing both the sets of propellers (314 and 316) simultaneously to generate a different sound than when utilizing only the first configuration of propellers 314. The instructions may indicate the usage of both sets of propellers (314 and 316) to generate a sound that is pleasurable and tolerable to nearby users during take-off or ascension to a particular height before returning to the origin location.

Figure 4:
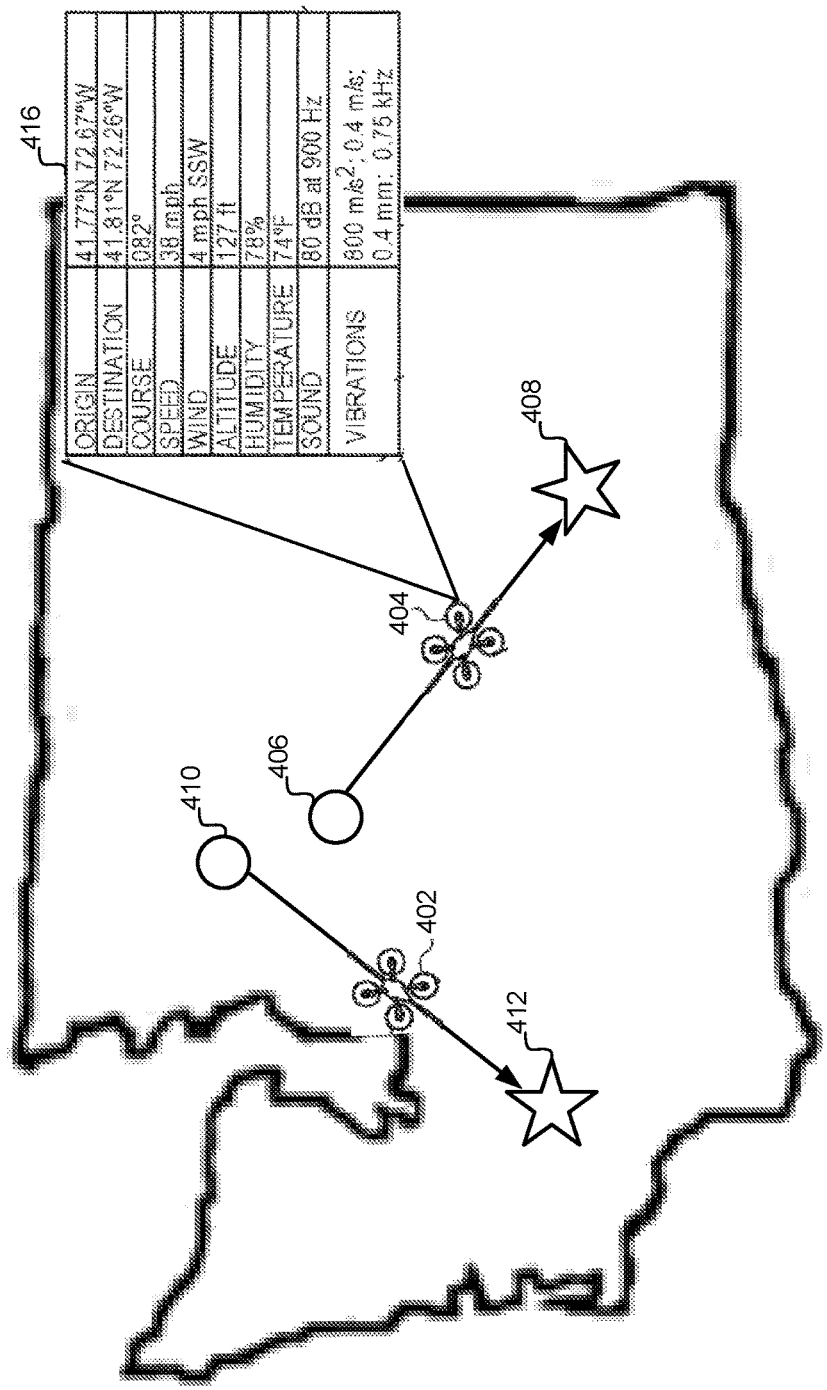
FIG. 4 illustrates aspects of a system for dynamic sound reduction/alteration while delivering an item, according to embodiments.

Any or a combination of sets of propellers of different sizes may facilitate the altering or reducing of sound generated by the UAV during delivery of an item. FIG. 4 illustrates aspects of a system for dynamic sound reduction/alteration while delivering an item, according to embodiments.

FIG. 4 illustrates one or more UAVs 402 and 404 that are engaged in flight between origins (406 and 410) and destinations (408 and 412) during delivery of an item. For example, the UAV 404 is shown en route between 406 and 408, while the UAV 402 is shown en route between 410 and 412. The UAVs 402 and 404 are configured to capture extrinsic or intrinsic information or data 416 regarding the UAVs 402 and 404 and the environments in which the UAVs 402 and 404 are operating, including but not limited to information or data regarding locations, altitudes, courses, speeds, climb or descent rates, turn rates, accelerations, wind velocities, humidity levels and temperatures, sounds, etc., using one or more sensors. The UAVs 402 and 404 are also configured to capture sounds 416 and vibrations 416 generated by the UAVs during their respective flights.

For example, as is shown in the information or data 416 of FIG. 4, the UAV 404 is traveling on a course of 082° and at a speed of 38 miles per hour (mph), in winds of 4 mph out of the south southwest, at an altitude of 127 feet, in air having 78 percent humidity and a temperature of 74 degrees Fahrenheit (° F.), and the sound measured around the UAV 404 is 80 decibels ("dB") at 900 Hz. While the illustration in FIG. 4 only shows sound measurements for a single location on the UAV, it will be appreciated that the information or data 416 may include sounds measured adjacent or near each propeller of each UAV. For example, if aerial vehicle 404 includes eight propellers, it may also include eight sensors that measure sound data 416. The operational information may also indicate the position for one or more propeller blade treatments of each propeller blade, the rotational speed, and/or the power draw required to generate the commanded lifting to aerially navigate the aerial vehicle. The information may also indicate the size of each propeller blade and position of the motor utilizing said size of propeller blade relative to UAV 404.

In accordance with the present disclosure, the UAVs 402 and 404 may be configured to provide both the extrinsic and intrinsic information or data 416 (e.g., information or data regarding environmental conditions, operational characteristics or tracked positions of the UAVs 402 and 404), and also the information or data 416 regarding the sounds recorded during the transits of the UAVs 402 and 404 to a data processing system. The information or data 416 may be provided to the data processing system either in real time or in near-real time while the UAVs 402 and 404 are in transit, or upon their arrival at their respective destinations. In some embodiments, the extrinsic and intrinsic information or data 416, e.g., observed environmental signals e(t), is provided to a machine learning system as a set of training inputs, and the information or data 416, e.g., measured sound data, regarding the sounds recorded by each of the sensors during the transits of the UAVs 402 and 404 is provided to the machine learning system as a set of training outputs for each of the sound control systems of the aerial vehicle. As discussed above, the sound data will be included for each propeller size utilized during flight.

The machine learning system may be fully trained using a substantial corpus of observed environmental signals e(t) correlated with measured sounds that are obtained using each of the sensors of one or more of the UAVs 402 and 404, and others, to develop sound models for each propeller size and location on UAVs 402 and 404 during flight. After the machine learning system has been trained, and the sound profiles developed, the machine learning system may be provided with a set of extrinsic or intrinsic information or data (e.g., environmental conditions, operational characteristics, or positions) that may be anticipated in an environment in which a UAV is operating or expected to operate and the machine learning system will provide predicted sounds for each propeller size configuration of the UAV. In some implementations, the machine learning system may reside and/or be operated on one or more computing devices or machines provided onboard one or more of the UAVs 402 and 404. The machine learning system may receive information or data regarding the corpus of sound signals observed and the sounds measured by sensors of the other UAVs (not pictured), for training purposes and, once trained, the machine learning system may receive extrinsic or intrinsic information or data that is actually observed by the UAV, e.g., in real time or in near-real time, as inputs and may generate outputs corresponding to predicted sounds based on the information or data.

In other implementations, the machine learning system may reside and/or be operated on one or more centrally located computing devices or machines. The machine learning system may receive information or data regarding the corpus of sounds measured by sensors of each of the UAVs 402 and 404. Once the machine learning system is trained, the machine learning system may be used to program computing devices or machines of the UAVs in a fleet with sound profiles that predict sounds of different propeller sizes during operation of the UAV, based on extrinsic or intrinsic information or data that is actually observed by the respective UAV. In still other implementations, the machine learning system may be programmed to receive extrinsic or intrinsic information or data from operating UAVs, e.g., via wireless means, as inputs. The machine learning system may then generate outputs corresponding to predicted sounds at different propeller sizes on the UAV based on the received information or data and return such predicted sounds to the UAVs. For example, the UAV and the machine learning system may exchange batches of information that is collected over a period of time. For example, a UAV may measure extrinsic and/or intrinsic information or data for a period of five seconds (or any other period of time) and transmit that measured information or data to the machine learning system or management module implementing the machine learning system. The machine learning system, upon receiving the information or data, generates outputs corresponding to predicted sounds at different propeller sizes, treatments, compositions, dressings, and rotational speeds on the UAV based on the received information or data and transmits those outputs to the UAV. The UAV may then use the received outputs to determine which particular sets of different sized propeller blades that cause the UAV to generate a corresponding sound or anti-sound and produce a commanded lift when the propeller is rotated. Alternatively, or in addition thereto, the received outputs may be used by the UAV to determine which particular sets of different sized propeller blades will result in the sound being dampened or otherwise altered (e.g., frequency spectrum changed). Likewise, in addition to altering or modulating between different sets of different sized propellers blades, the shape of the propeller blade may also be adjusted. This process may continue while the UAV is in-flight or operational.

For example, when variables such as an origin, a destination, a speed and/or a planned altitude for the UAV 404 (e.g., a flight plan for the UAV) are known, and where variables such as environmental conditions and operational characteristics may be known or estimated, such variables may be provided as inputs to the trained machine learning system. Subsequently, sounds that may be predicted at for each propeller size of the UAV 404 as the UAV 404 travels from the origin 406 to the destination 408 within such environmental conditions and according to such operational characteristics may be received from the trained machine learning system as outputs. From such outputs, configurations of different sets of propellers of different sizes or modulates from a first set of propellers of a first size to a second set of propellers of a second size and rotational speeds may be determined that will alter the generated sound, e.g., generate an anti-sound, and/or dampen the generated sound of UAV 404. The adjustments may be determined and implemented in real time or near-real time as the UAV 404 is en route from the origin 406 to the destination 408.

Figure 5:
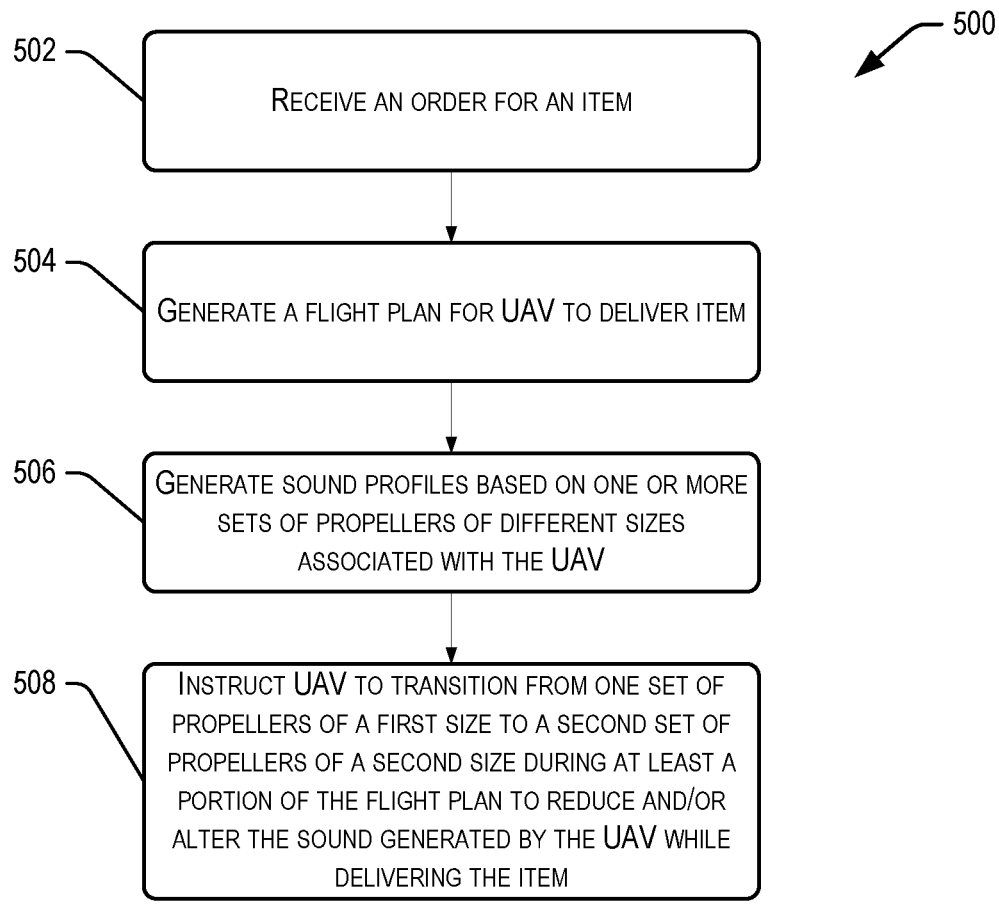
FIG. 5 illustrates an example flow for reducing and/or altering sound while delivering an item, according to embodiments.
Figure 6:
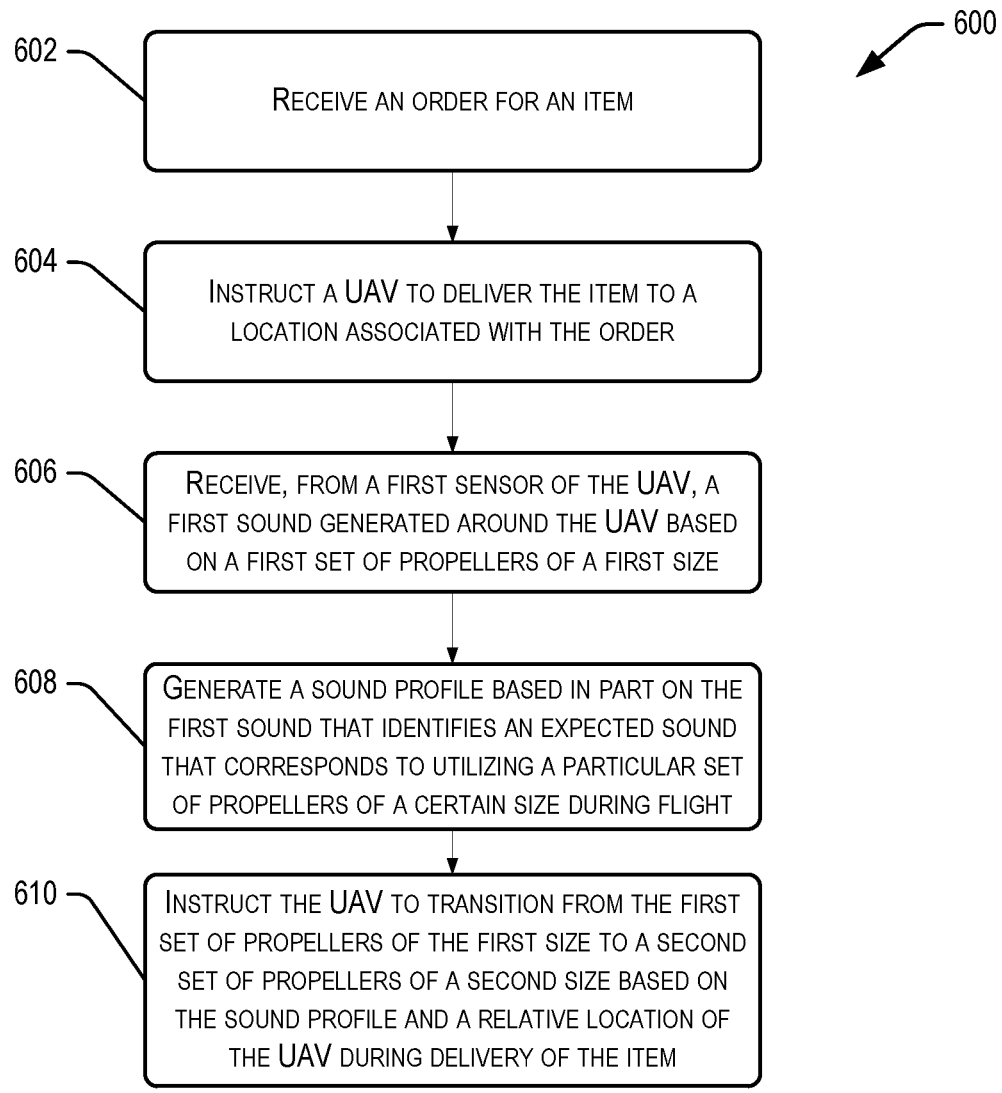
FIG. 6 illustrates an example flow for reducing and/or altering sound while delivering an item, according to embodiments.

Turning to FIGS. 5 and 6, the figures FIGS. 5 and 6 illustrate example flows 500 and 600 for reducing and/or altering sound while delivering an item, according to embodiments. In the illustrative operations, some of the operations or functions may be embodied in, and fully or partially automated by, a management component (e.g., the management component 202 of FIG. 2). Nevertheless, other or a combination of other electronic and/or mechanical components may be additionally or alternatively used. Also, while the operations are illustrated in a particular order, it should be understood that no particular order is necessary and that one or more operations may be omitted, skipped, and/or reordered.

The example flow 500 of FIG. 5 may start at operation 502, where an order for an item may be received. For example, the order may be received at a network-based resource associated with an electronic marketplace. The electronic marketplace may offer the item. The order may be received from a computing device of a user accessing the network-based resource. At operation 504, a flight plan or instructions for delivering the item to a destination may be generated for the UAV. The received order may be processed to generate a mission and/or flight plan. The mission/flight plan may specify a delivery location and/or a delivery surface associated with the user and, as applicable, data associated with an expected environment at the delivery location and/or delivery surface. The mission may be provided to a UAV to cause a deployment thereof. For instance, data about the mission may be transmitted to a management component of the UAV.

At operation 506, one or more sound profiles are generated based in part on one or more sets of propellers of different sizes that are associated or configured on the UAV. In some embodiments, the one or more sound profiles identify an expected generated sound from the UAV based on utilizing a particular configuration of propellers of different sizes. In embodiments, the one or more sound profiles identify an expected generated sound from the UAV based on different treatments, angles, or other dressings of the propellers of different sizes. The UAV may autonomously or semi-autonomously execute the mission or portions thereof including, for example, flying to the delivery location, delivering the package including the item, and returning to a home base. In an autonomous execution, the management component of the UAV may manage and control the execution of the portions of the mission including modulating between propellers of different sizes to reduce and/or alter the sound generated by the UAV. In a semi-autonomous execution, the management component may do so in coordination or under the instructions of another management component. This other component may be a ground component in remote communication with the UAV's management component.

At operation 508, the UAV may be instructed to modulate from one set of propellers of a first size to a second set of propellers of a second size during at least a portion of the flight plan (delivery path to the delivery location) to reduce and/or alter the sound generated by the UAV. In embodiments, a relative location or a determination of a stage of the flight plan may be utilized as a data point in determining the modulation between propellers of different sizes that are associated with the UAV to reduce and/or alter the sound generated by the UAV. This determination may be based on current location data of the UAV (e.g., GPS coordinates) and based on comparing this location data to that of the delivery location.

Arriving to the delivery location may include arriving at the exact delivery location or to a vicinity of the delivery location. Once at the delivery location, the UAV may sense, as applicable, various environmental data to determine or update the sound profile and thereby update which particular sets of propellers to utilize to generate an expected sound according to a sound profile. The UAV may deliver the item and modulate to yet another set of propellers of a different size for a return trip to the facility or origin location. In some embodiments, multiple sets of propellers of different sizes may be utilized in one or more configurations to reduce and/or alter the sound generated by the UAV at different locations of the UAV during the delivery (e.g., an expected sound during transit at a certain altitude as opposed to another expected sound during delivery at the delivery location). Based on expected or detected environment conditions around the delivery location as well as intrinsic data, the UAV may perform different maneuvers and utilize one or more configurations of different sized propellers to complete delivery of the item to a delivery location.

The example flow 600 of FIG. 6 may start at operation 602, where an order for an item may be received. For example, the order may be received at a network-based resource associated with an electronic marketplace. At operation 604, a flight plan or instructions for delivering the item to a destination may be generated for the UAV. The received order may be processed to generate a mission and/or flight plan. The mission/flight plan may specify a delivery location and/or a delivery surface associated with the user and, as applicable, data associated with an expected environment at the delivery location and/or delivery surface. At operation 606, a first sound generated around the UAV may be received from a first sensor associated with the UAV based on the UAV utilizing a first set of propellers of a first size. In embodiments, the UAV may be outfitted or configured to utilize a plurality of sets of propellers of different sizes.

At operation 608, a sound profile may be dynamically generated for the UAV based in part on the first sound. The sound profile may identify an expected sound that corresponds to utilizing a particular set of propellers of a certain size during flight. In embodiments, other data such as environment data may be used in conjunction with the data from the first sensor to generate the sound profile for the UAV. In some embodiments, the metrics included in the generated sound profile may be compared to a threshold to determine whether any particular metric or metrics exceed a threshold associated with the stage of the flight plan. For example, during transit (i.e., between the origin location and the delivery location) one or more thresholds may be specified to tolerate higher metric values included in the sound profile. In comparison, during landing the thresholds may be specified to be restrictive and thereby reduce and/or alter the sound generated by the UAV. At operation 610, the UAV may be instructed or receive instructions to modulate from the first set of propellers of the first size to a second set of propellers of a second size based on the sound profile and a relative location of the UAV during delivery of the item. As described herein, the sound profile generated may indicate that the UAV's current configuration or utilization of propellers of a first size is generated sound that should be reduced or altered. As such, the instructions may modulate the UAV to utilize other sets of propellers of a different size to reduce or alter the generated noise. The selection of the particular sets of propellers of different sizes may be determined based on the dynamically generated sound profiles that identify an expected sound when utilizing a particular set of propellers of different size from the currently utilized sets of propellers.

Figure 7:
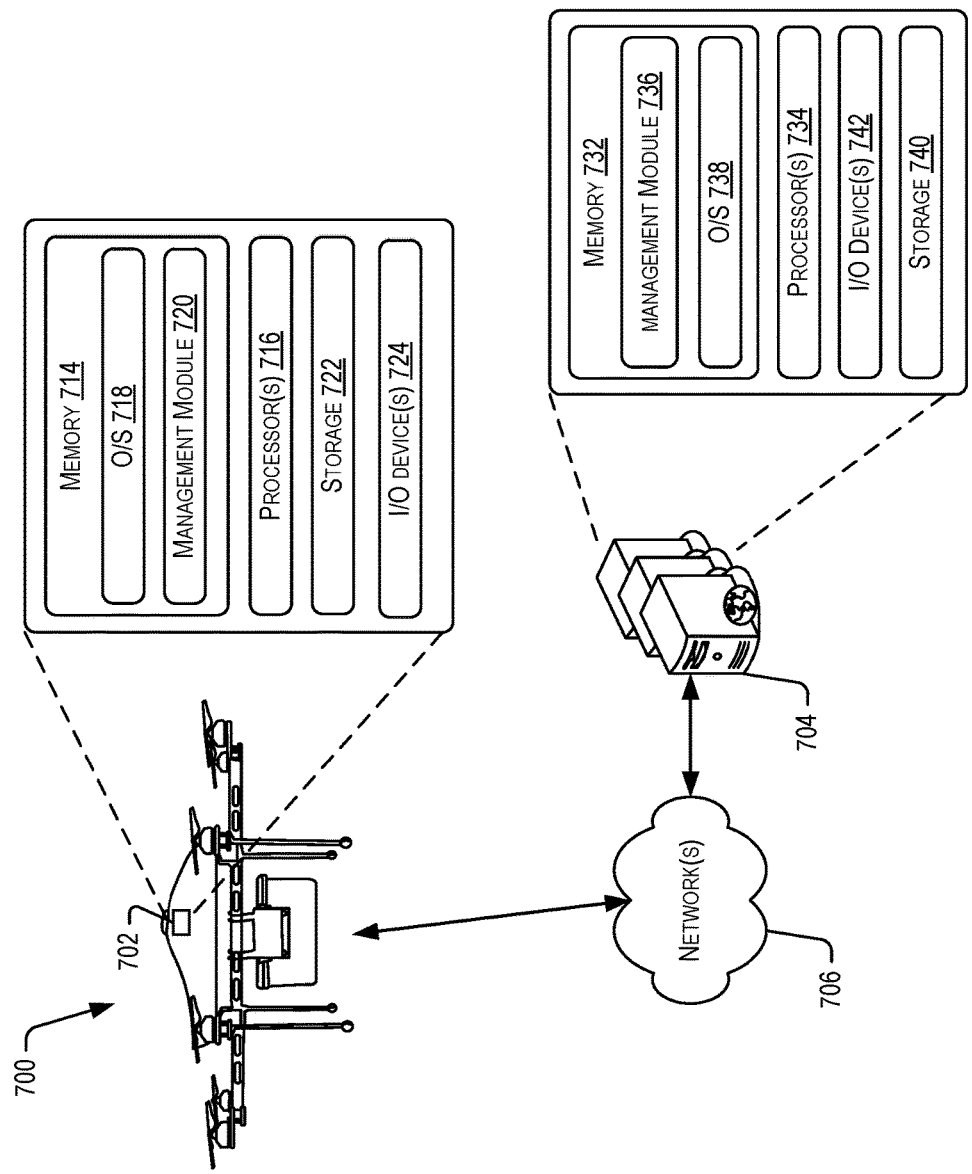
FIG. 7 illustrates an example computing architecture for reducing and/or altering sound while delivering an item, according to embodiments.

Turning to FIG. 7, a computing environment for implementing some of the above-described features within the context of reducing or altering sound generated by a UAV during delivery of an item is illustrated. The architecture may include a UAV 700, a server 704, and a network 706. Generally, the architecture may be implemented as part of an electronic marketplace offering items. For example, the server 704 may be in communication with the UAV 700 to facilitate a delivery of an item ordered from the electronic marketplace. This communication may occur over the network 706. The network 706 may include any one or a combination of many different types of networks, such as wireless networks, cable networks, cellular networks, radio networks, the Internet, and other private and/or public networks.

Turning now to the details of the server 704, the server 704 may include one or more service provider computers, such as servers and other suitable computing devices, configured to offer various data services to users. The server 704 may be configured to host a web site (or combination of web sites) accessible to customers. The web site may be accessible via a web browser and may enable a customer to place an order for an item.

In embodiments, the server 704 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the server 704 may include one or more servers, perhaps arranged in a cluster, or as individual servers not associated with one another.

In one illustrative configuration, the server 704 may include at least one memory 732 and one or more processing units (or processor(s)) 734. The processor(s) 734 may be implemented as appropriate in hardware, computer-executable instructions, software, firmware, or combinations thereof. Computer-executable instruction, software, or firmware implementations of the processor(s) 734 may include computer-executable or machine-executable instructions written in any suitable programming language to perform the various functions described. The memory 732 may include more than one memory and may be distributed throughout a plurality of a network of servers. The memory 732 may store program instructions (e.g., management module 736) that are loadable and executable on the processor(s) 734, as well as data generated during the execution of these programs. Depending on the configuration and type of memory, the memory 732 may be volatile (such as random access memory (RAM)) and/or non-volatile (such as read-only memory (ROM), flash memory, or other memory).

The server 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 732 may include multiple different types of memory, such as static random access memory (SRAM), dynamic random access memory (DRAM), or ROM.

Turning to the contents of the memory 732 in more detail, the memory 732 may include an operating system 738 and one or more application programs, modules or services for implementing the features disclosed herein including at least a management module 736. The management module 736, in some examples, may support, direct, manage, and/or control operations of some or all of the components of the UAV 700. For instance, the management module 736 may transmit data associated with a delivery of an item to the UAV 700. Such data may be used by the UAV 700, such as by a management module thereat, to deliver the item and modulate from one set of propellers of a first size to a second set of propellers of a second size. Furthermore, the management module 736 may be used to select and deploy the UAV 700 on a delivery mission. As part of this selection, the management module 736 may also select a configuration of propellers of different sizes that may be used in the delivery of the item. The selection of the configuration of propellers of different sizes, including modulations that will occur during delivery between the sets of propellers of different sizes, may be based on a number of parameters as described herein. Further, the management module 736 may receive data from the UAV 700 during the deployment and/or execution of the delivery mission. The management module 736 may process that data and provide, as applicable, further instructions to the UAV 700 to adjust the delivery of the item and/or adjust the modulation or simultaneous configuration of propellers of different sizes.

In some examples, the server 704 may also include additional storage 740, which may include removable storage and/or non-removable storage. The additional storage 740 may include, but is not limited to, magnetic storage, optical disks, and/or tape storage. The disk drives and their associated computer-readable media may provide non-volatile storage of computer-readable instructions, data structures, program modules, and other data for the computing devices.

The memory 732 and the additional storage 740, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors). The modules of the server 704 may include one or more components. The server 704 may also include I/O device(s) and/or ports 742, such as for enabling connection with a keyboard, a mouse, a pen, a voice input device, a touch input device, a display, speakers, a printer, or other I/O device.

Turning now to the details of the UAV 700, the UAV 700 may include some or all of the components of the UAV 200 described in connection with FIG. 2. In an illustrative embodiment, the UAV 700 may include a management component implemented, in part or in full, by computing system 702 similar to the computing system 204 of FIG. 2. The computing system 702 may include at least one memory 714 and one or more processing units (or processor(s)) 716. The processor(s) 716 may be implemented as appropriate in hardware, computer-executable instructions, software, firmware, or combinations thereof. Computer-executable instruction, software, or firmware implementations of the processor(s) 716 may include computer-executable or machine-executable instructions written in any suitable programming language to perform the various functions described. The memory 714 may include more than one memory and may be distributed throughout the computing system 702. The memory 714 may store program instructions (e.g., a management module 720) that are loadable and executable on the processor(s) 716, as well as data generated during the execution of these programs. Depending on the configuration and type of memory, the memory 714 may be volatile (such as random access memory (RAM)) and/or non-volatile (such as read-only memory (ROM), flash memory, or other memory).

The computing system 702 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 714 may include multiple different types of memory, such as static random access memory (SRAM), dynamic random access memory (DRAM), or ROM.

In some examples, the computing system 702 may also include additional storage 722, which may include removable storage and/or non-removable storage. The additional storage 722 may include, but is not limited to, magnetic storage, optical disks, and/or tape storage. The disk drives and their associated computer-readable media may provide non-volatile storage of computer-readable instructions, data structures, program modules, and other data for the computing devices.

The memory 714 and the additional storage 722, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computing system 702 may include one or more components.

Turning to the contents of the memory 714 in more detail, the memory 714 may include an operating system 718 and one or more application programs, modules or services for implementing the features disclosed herein including at least a management module 720. The management module 720 may be configured to provide flight operation management functions and/or to manage operations of different components to deliver an item at a delivery location. In an example, the management module 720 may operate autonomously or independently of the management module 736 of the server 704. In another example, the management module 720 may operate semi-autonomously or be fully controlled by the management module 736.

The computing system 702 may also include I/O device(s) 726 (e.g., interfaces, ports) such as for enabling connection with the server 704. The I/O device(s) 726 may also enable communication with the other components and systems of the UAV 700 (e.g., a propulsion system, and a payload holding system, a payload releasing system, a propeller modulating system).

Figure 8:
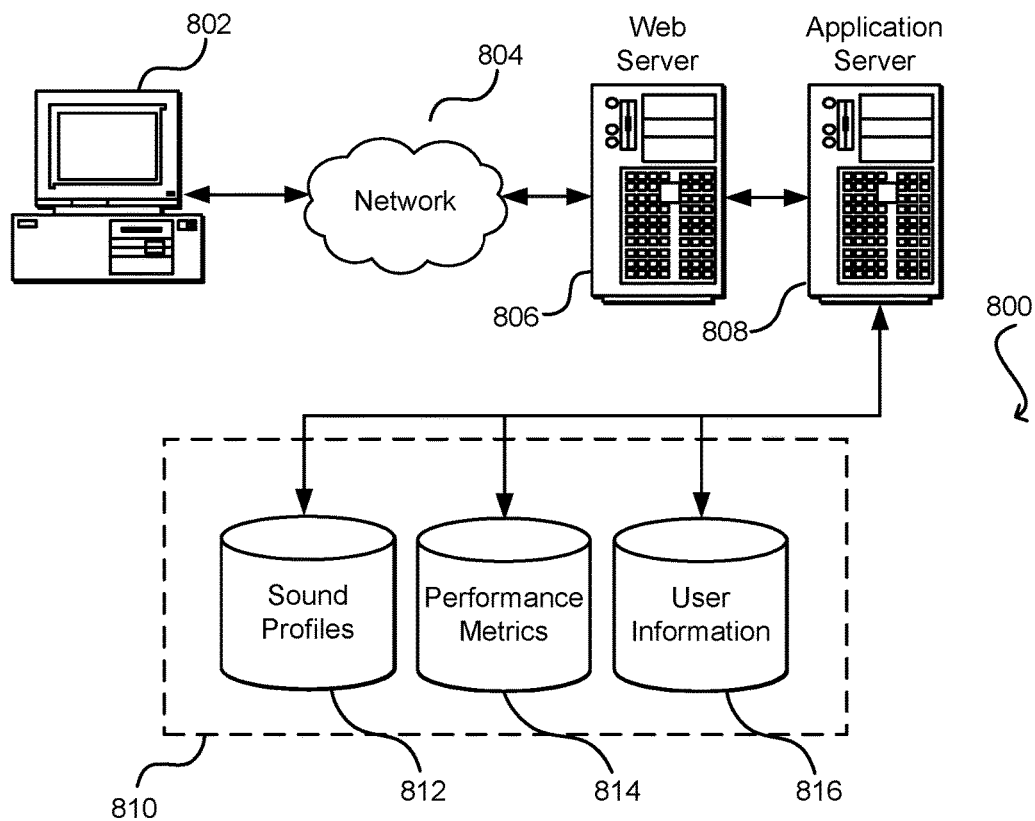
FIG. 8 illustrates an example environment for reducing and/or altering sound while delivering an item.

FIG. 8 illustrates an example environment for reducing and/or altering sound while delivering an item. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the UAV (via a client device) or to the UAV itself. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and/or UAV, handling a majority of the data access and logic for an application. The application server provides access control services in cooperation with the data store and is able to generate content such as text, graphics, audio and/or video to be transferred to the user, which may be served to the user by the Web server 806 in the form of HyperText Markup Language ("HTML"), Extensible Markup Language ("XML"), another appropriate structured language in this example, or via an application and graphical user interface. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing information which can be used by modules described herein, such as sound profiles 812, performance metrics 814, and/or user information 816. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle (UAV) comprising:
a frame;
a propulsion system associated with the frame, the propulsion system comprising:
a first motor associated with a first propeller of a first size, and
a second motor associated with a second propeller of a second size; and
a computing system configured to manage the propulsion system during a flight associated with delivery of a payload to a location, the computing system configured to:
modulate, from the first motor to the second motor based in part on a sound generated by the UAV during the flight to the location;
obtain input that identifies activation of a release mechanism of the UAV to deliver the payload to the location; and
instruct modulation of the first motor and the second motor based at least in part on the input.

2. The UAV of claim 1, wherein the computing system is further configured to:
receive information indicating that the first motor is malfunctioning; and
instruct the UAV to modulate to the second motor.

3. The UAV of claim 1, wherein the computing system is further configured to:
request, from a user associated with the location for the delivery of the payload, input regarding a sound level of the UAV during delivery;
update, by the computer system, a sound profile associated with the UAV based in part on the input from the user; and
instruct the UAV to modulate from the first motor to the second motor or from the second motor to the first motor to alter the sound generated by the UAV.

4. The UAV of claim 1, wherein the first propeller of the first size is a different material composition than the second propeller of the second size.

5. An unmanned aerial vehicle (UAV) comprising:
a frame;
a propulsion system associated with the frame, the propulsion system comprising:
one or more sets of propellers of different sizes; and
a computing system configured to manage the propulsion system during a flight associated with delivery of an item to a location, the computing system configured to:
generate a sound profile based on a first sound generated by the UAV during flight, the sound profile utilized to modulate, during flight, between a first set of propellers of a first size and a second set of propellers of a second size to alter the first sound generated by the UAV;
obtain input that identifies activation of a release mechanism of the UAV to deliver the item to the location; and
instruct modulation between the first set of propellers of the first size and the second set of propellers of the second size based at least in part on the input.

6. The UAV of claim 5, wherein the computing system is further configured to receive from a first sensor associated with the UAV, a second sound generated around the UAV based on sounds from the surrounding environment.

7. The UAV of claim 6, wherein generating the sound profile is further based in part on the second sound.

8. The UAV of claim 7, wherein the computing system is further configured to:
receive from the first sensor an updated first sound and an updated second sound;
update the sound profile based in part on the updated first sound and the updated second sound; and
instruct the UAV to modulate from the first set of propellers of the first size to the second set of propellers of the second size based at least in part on a sound metric of the updated sound profile and a threshold.

9. The UAV of claim 5, wherein the first set of propellers of the first size include one or more propeller dressings.

10. The UAV of claim 5, wherein modulating from the first set of propellers of the first size to the second set of propellers of the second size includes altering a rotational speed associated with the propellers of the second size.

11. The UAV of claim 5, wherein the computing system is further configured to determine a first rotational speed for the first set of propellers of the first size and a second rotational speed for the second set of propellers of the second size to generate an anti-sound by the UAV based at least in part on the sound profile, the anti-sound comprising frequencies that are approximately opposite of each other.

12. The UAV of claim 5, wherein the first set of propellers of the first size are angled relative to the UAV in a first position and the second set of propellers of the second size are angled relative to the UAV in a second position.

13. The UAV of claim 5, wherein the first sound is utilized to train a machine learning algorithm to generate subsequent sound profiles for the UAV using updated sounds generated by the UAV during flight.

14. The UAV of claim 5, wherein modulating from the first set of propellers of the first size to the second set of propellers of the second size is further based in part on a relative location of the UAV in a flight plan to deliver the item.

15. An unmanned aerial vehicle (UAV) comprising:
a frame;
a propulsion system associated with the frame, the propulsion system comprising:
one or more sets of propellers of different sizes; and
a computing system configured to manage the propulsion system during a flight associated with delivery of a package to a location, the computing system configured to:
modulate between sets of propellers of different sizes during the flight to alter a sound generated by the UAV;
obtain input that identifies activation of a release mechanism of the UAV to deliver the item to the location; and
instruct modulation between the one or more sets of propellers of different sizes based at least in part on the input.

16. The UAV of claim 15 further comprising a first sensor configured to obtain environmental input within a certain distance of the UAV during the flight, wherein the environmental input includes one or more of at least temperature, pressure, humidity, wind speed, wind direction, a calendar date, cloud coverage, sunshine, surface conditions or textures within an environment, or a pollution level.

17. The UAV of claim 15, wherein the computing system is further configured to:
obtain performance metrics of a first set of propellers of a first size and a second set of propellers of a second size during flight; and
instruct the UAV to modulate from the first set of propellers to the second set of propellers based in part on the performance metrics indicating component failure.

18. The UAV of claim 15, wherein modulating from a first set of propellers of a first size to a second set of propellers of a second size, the first set of propellers of the first size and the second set of propellers of the second size of the one or more sets of propellers of different sizes, is based in part on a set of sound metrics associated with the sound generated by the UAV, the set of sound metrics including a decibel level, a loudness level, a sharpness level, a roughness level, and a fluctuation strength.

19. The UAV of claim 18, wherein modulating from the first set of propellers of the first size to the second set of propellers of the second size during flight is further based in part on metrics obtained from a first sensor and a second sensor and a threshold associated with the location.

* * * * *